(12) United States Patent
Mayo et al.

(10) Patent No.: US 8,290,362 B2
(45) Date of Patent: Oct. 16, 2012

(54) PREDICTIVE END-TO-END MANAGEMENT FOR SONET NETWORKS

(75) Inventors: David Mayo, Washington Township, Bergen County, NJ (US); Meei-Ling Chen, Branchburg, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 781 days.

(21) Appl. No.: 12/074,388

(22) Filed: Mar. 4, 2008

(65) Prior Publication Data

US 2009/0226164 A1 Sep. 10, 2009

(51) Int. Cl.
*H04B 10/08* (2006.01)
*H04B 17/00* (2006.01)

(52) U.S. Cl. .................. 398/10; 398/9; 398/11; 398/12; 398/13; 398/14; 398/15; 398/16; 398/17; 398/18; 398/19; 398/20; 398/21; 398/22; 398/23; 398/24; 398/25; 398/26; 398/27; 398/28; 398/29; 398/30; 398/31; 398/32; 398/33; 398/34; 398/35

(58) Field of Classification Search .................. None
See application file for complete search history.

(56) References Cited

U.S. PATENT DOCUMENTS

| | | | | |
|---|---|---|---|---|
| 5,831,972 | A * | 11/1998 | Chen | 370/230 |
| 6,359,729 | B1 * | 3/2002 | Amoruso | 359/341.1 |
| 6,795,394 | B1 * | 9/2004 | Swinkels et al. | 370/222 |
| 7,155,123 | B2 * | 12/2006 | Levy et al. | 398/33 |
| 2002/0141009 | A1 * | 10/2002 | Yu et al. | 359/110 |
| 2002/0159114 | A1 * | 10/2002 | Sahasrabuddhe et al. | 359/117 |
| 2003/0208705 | A1 * | 11/2003 | Taylor | 714/45 |
| 2004/0208527 | A1 * | 10/2004 | Mantin et al. | 398/33 |

OTHER PUBLICATIONS

Telcordia, Synchronous Optical Network (SONET) Transport Systems: Common Generic Criteria (GR-253-CORE), Dec. 2005, Issue 4, 6-112 to 6-118.*

* cited by examiner

*Primary Examiner* — Kenneth N Vanderpuye
*Assistant Examiner* — Darren E Wolf

(57) ABSTRACT

A system and method is disclosed that allows for the monitoring, analyzing and reporting on performance, availability and quality of optical network paths. The correlation of PM parameter metrics to client connections, coupled with threshold-based alarm generation provides a proactive and predictive management, reporting and analyzing of the health and effectiveness of individual path connections to alert Operational Support (OS) staff and/or customers to signal degradation and impending Network Element (NE) failures. The system and method performs in real-time processing intervals required for alarm surveillance in a telecommunications network.

14 Claims, 12 Drawing Sheets

FIG. 5A

| PARAMETER | DEFINITION |
|---|---|
| CV-P | Near-End STS Path Coding Violations (CV-P) is a count of BIP errors detected at the STS path layer (that is, using the B3 byte). Up to eight BIP errors can be detected per frames: each error increments the current CV-P second register. |
| ES-P | Near-End STS Path Errored Seconds (ES-P) is a count of the seconds when at least one STS path BIP error was detected. An AIS-P defect (a lower-layer, traffic-related, near-end defect) or an LOP-P defect can also cause an ES-P. |
| SES-P | Near-End STS Path Severely Errored Seconds (SES-P) is a count of the seconds when K (2400) or more STS path BIP errors were detected. An AIS-P defect (a lower-layer, traffic-related, near-end defect) or an LOP-P defect can also cause an (SES-P) |
| SEFS-P | Severely Errored Framing Seconds (SEFS-S) is a count of the seconds when an SEF defect was present. An SEF defect is expected to be present during most seconds when an LOS or loss of frame (LOF) defect is present. However, there can be situations when the SEFS-S parameter is only incremented based on the presence of the SEF defect. |
| UAS-P | Near-End Path Unavailable Seconds (UAS-P) is a count of the seconds when the STS path was unavailable. An STS path becomes unavailable when ten consecutive seconds occur that qualify as SES-Ps, and continues to be unavailable until ten consecutive seconds occur that do not qualify as SES-Ps. |
| PSC-W | For a working line in a two fiber BLSR, Protection Switching Count-Working (PSC-W) is a count of the number of times traffic switches away from the working capacity in the failed line and back to the working capacity after the failure is cleared. PSC-W increments on the failed working line and PSC increments on the active protect line. For a working line in a four-fiber BLSR, PSC-W is a count of the number of times service switches from a working line to a protection line plus the number of times it switches back to the working line. PSC-w increments on the failed line and PSC-R or PSC-S increments on the active protect line. |
| PSC-P (Nortel) | For a protection line, PSC-P is the number of times the service switched from the working line to the protection line, plus the number of times the service switched back to the working line. |

FIG. 5B

| | |
|---|---|
| PPJC-Pget (Cisco) | Positive Pointer Justification Count, STS Path Detected (PPJC-Pget-P) is a count of the positive pointer justifications detected on a particular path in an incoming SONET signal |
| NPJC-Pdet (Cisco) | Negative Pointer Justification Count, STS Path Generated (NPJC-Pdet-P) is a count of the negative pointer justifications detected on a particular path in an incoming SONET signal. |
| PPJC-Pgen (Cisco) | Positive Pointer Justification Count, STS Path Generated (PPJC-Pgen-P) is a count of the positive pointer justifications generated for a particular path to reconcile the frequency of the SPE with the local clock. |
| NPJC-Pgen (Cisco) | Negative Pointer Justification Count, STS Path Generated (NPJC-Pgen-P) is a count of the negative pointer justifications generated for a particular path to reconcile the frequency of the SPE with the local clock |
| PSC | In a 1 + 1 protection scheme for a working card, Protection Switching Count (PSC) is a count of the number of times service switches from a working card to a protection card plus the number of times service switches back to the working card. For a protection card, PSC is a count of the number of times service switches to a working card from a protection card plus the number of times service switches back to the protection card. The PSC PM is only applicable if revertive line-level protection switching is used. |
| PSC-R (Cisco) | In a four-fiber BLSR, Protection Switching Count-Ring (PSC-R) is a count of the number of times service switches from a working line to a protection line plus the number of times it switches back to a working line. A count is only incremented if ring switching is used. |
| PSC-S (Cisco) | In a four-fiber BLSR, Protection Switching Count-Spam (PSC-S) is a count of the number of times service switches from a working line to a protection line plus the number of times it switches back to a working line. A count is only incremented if span switching is used. |
| CVCP-P (Cisco) | Code Violation CP-Bit Path (CVCP-P) is a count of CP-bit parity errors occurring in the accumulation period. |
| ESCP-P (Cisco) | Errored Second CP-Bit Path (ESCP-P) is a count of seconds containing one or more CP-bit parity errors, one or more SEF defects, or one or more AIS defects. ESCP-P is defined for the C-bit parity application. |

FIG. 5C

| | |
|---|---|
| SESCP-P (Cisco) | Severally Errored Second CP-Bit Path (ESCP-P) is a count of seconds containing more than 44 CP-bit parity errors, one or more SEF defects, or one or more AIS defects. |
| PSD | Protection Switching Duration (PSD) applies to the length of time, in seconds, that service is carried on another line. For a working line, PSD is a count of the seconds that the line was used to carry service. The PSD PM is only applicable if revertive line-level protection switching is used. |
| PSD-R (Cisco) | In a four-fiber BLSR, Protection Switching Duration-Ring (PSD-R) is a count of the seconds that the protection line was used to carry service. A count is only incremented if ring switching is used. |
| PSD-W (Cisco) | For a working line in a two-fiber BLSR, Protection Switching Duration-Working (PSD-W) is a count of the number of seconds that service was carried on the protection line. PSD-W increments on the failed working line and PSD increments on the active protect line. |
| PSD-S (Cisco) | In a four-fiber BLSR, Protection Switching Duration-Span (PSD-S) is a count of the seconds that the protection line was used to carry service. A count is only incremented if span switching is used. |
| WAN ES/ES | Errored seconds |
| WAN UAS/UAS | Unavailable seconds |
| WAN mean Util/UTL | Average WAN link Utilization (Rx and Tx) |
| WAN peak Util/UTLMX | Maximum (peak) WAN link Utilization (Rx and Tx) |
| LAN disc Frames/ INFRAMESDISCDS | Counts the total number of received frames that were chosen to be discarded even though no errors had been detected to prevent their delivery |
| LAN ES/ES | Errored seconds |
| LAN UAS/UAS | Unavailable seconds |
| LAN InFrames/ INFRAMES | Counts the total number of frames received on that interface (including errored frames) |
| LAN InOctets/ INOCTETS | Counts the total number of received octets (includes octets from both OK and errored frames) |

FIG. 7

| | | | THRESHOLD CROSSING - PM PARAMETER(x) | | | | | | | 22:15 15 Jan 2008 |
|---|---|---|---|---|---|---|---|---|---|---|
| | | | A SIDE INFORMATION | | | | Z SIDE INFORMATION | | | |
| CIRCUIT | SPEED | CIRCUIT TERMINATION POINT | CLIENT TROUBLE THRESHOLD | CLIENT VALUE | NETWORK TROUBLE THRESHOLD | NETWORK TROUBLE VALUE | CIRCUIT TERMINATION POINT | CLIENT TROUBLE THRESHOLD | CLIENT VALUE | NETWORK TROUBLE THRESHOLD | NETWORK TROUBLE VALUE |
| ABC | DS1 | SH1/SL7/P2 | 3 | 0 | 7 | 0 | SH1/SL7/P2 | 3 | ■ | 7 | 0 |
| DEF | OC3 | SH1/SL1/P1 | 3 | 0 | 7 | ■ | SH1/SL1/P1 | 3 | 0 | 7 | ■ |
| XYZ | DS3 | SH2/SL2/P8 | 3 | 0 | 7 | 0 | SH2/SL2/P8 | 3 | 0 | 7 | 0 |

PREDICTIVE END-TO-END MANAGEMENT FOR SONET NETWORKS

BACKGROUND OF THE INVENTION

The invention relates generally to network communications. More specifically, the invention relates to a system and method for predictive end-to-end network management for optical networks employing monitoring, correlating and alarming performance parameters.

A Synchronous Optical Networking (SONET) system includes switches, multiplexers and repeaters, all connected by optical fiber. SONET topologies are typically configured as self-healing, dual-ring networks using dual fiber optic cables.

The SONET physical layer is divided into four sublayers. The lowest sublayer is the photonic sublayer. The three remaining sublayers correspond to the sections, lines and paths. An optical fiber going directly from any device to any other device is referred to as a section. A run between two multiplexers is referred to as a line and the connection between a source node and a destination node with one or more multiplexers and repeaters is referred to as a path. The section sublayer handles a single point-to-point fiber run, generating a standard frame at one end and processing it at the other. Sections can start and end at repeaters, which amplify and regenerate the bits, but do not change or process them. The line sublayer is concerned with multiplexing multiple tributaries onto a single line and demultiplexing them at the other end. To the line sublayer, the repeaters are transparent. When a multiplexer outputs bits on a fiber, it expects them to arrive at the next multiplexer unchanged, no matter how many repeaters are used in between. The protocol in the line sublayer is between two multiplexers and deals with issues such as how many inputs are being multiplexed together and how. The path sublayer and protocol deal with end-to-end issues.

SONET and Synchronous Digital Hierarchy (SDH) have a limited number of defined architectures. These architectures allow for efficient bandwidth usage as well as the ability to transmit traffic even when part of the network has failed.

A major advantage of SONET networks is their standardized Automatic Protection Switching (APS) schemes. SONET systems can be configured as point-to-point terminals, linear add-drop chains and rings. Two types of self healing ring topologies are Unidirectional Path Switched Ring (UPSR) and Bi-directional Line Switched Ring (BLSR).

FIG. 1 shows a four node ring. Each node on the ring is connected to its respective adjacent nodes by two optical fibers, one transmits and one receives. The outer fiber loop may be referred to as ring 1 and the inner fiber loop is referred to as ring 2. In this example a path (circuit) is to be set up between nodes A and C. The input at node A travels clockwise on ring 1 and egresses at node C. The input to node C also travels clockwise on ring 1. The signal egresses at node A completing the path, establishing communications between source node A and destination node C. All that is required for the path to be operational is the ring 1 fiber unidirectional path.

Ring 1 is the working path and ring 2 is the protection path. Protection is facilitated by adding a bridging circuit at the SONET Network Element (NE) source node. Protection traffic travels anticlockwise on ring 2. A selector switch is implemented at the SONET NE destination node which chooses the signal that exits. Selection is made upon SONET Performance Monitoring (PM) path parameters such as Alarm Indication Signal (AIS), Loss of Pointer (LOP), Loss of Signal (LOS), Signal Degrade (SD), and others.

FIG. 2 shows a fiber break between nodes B and C. When the break occurs, the receiver at node C ring 1 detects an Optical Carrier (OC) OC-N LOS and inserts an Alarm Indication Signal-Path (AIS-P) onto all affected paths. When a drop node (in this case node C) detects the AIS-P on the working path, the selector performs a path switch to ring 2. Because node C is adjacent to the fiber break, all of its selectors will make a path switch. The output of node C on ring 1 has an AIS-P on all of its path signals except for those added at node C.

Node A will not detect the fiber break LOS, but the receiver on ring 1 will detect the AIS-P that is inserted onto the path at node C. Node A will receive its signal from B on ring 2. Node A is not adjacent to the fiber break so all its path selectors will switch based upon path integrity of each individual path independent of the status of any other path. Each node in a SONET ring makes the decision to switch independently without communicating to any of the other nodes.

Due to the large volume of PM parameter data possibly accumulated for an OC-N line, for example, a SONET OC-48 path from New York, N.Y. to Los Angeles, Calif., having many lines, it is difficult to analyze all of the accumulated PM parameter data. Even in the absence of serious fiber breaks, the amount of PM parameter data is voluminous. For slight path deficiencies, statistical counters and metrics have not been managed. What is desired is a system and method that provides a customer with predictive end-to-end path management of his SONET networks.

SUMMARY OF THE INVENTION

The inventors have discovered that it would be desirable to have a system and method that allows for the monitoring, analyzing and reporting on performance, availability and quality of optical network paths. The correlation of PM parameter metrics to customer paths, coupled with threshold-based alarm generation provides proactive and predictive management, reporting, and analyzing of the status and effectiveness of individual paths. Operational Support (OS) staff and/or customers may be alerted to signal degradation and impending NE failures. The system and method performs in real-time processing intervals required for alarm surveillance in a telecommunications network. Methods correlate and analyze PM parameter metrics and generate alarms using baseline thresholds.

One aspect of the invention provides a method for assessing the status of a network path. Methods according to this aspect of the invention include accessing a network provisioned path database, selecting a path, for the path, identifying the path source terminating node A and path destination terminating node Z, correlating the path nodes A and Z to physical ports at nodes A and Z for monitoring path points of interest $A_{client}$ and $A_{network}$, obtaining Performance Monitoring (PM) parameter data for path points of interest $A_{client}$ and $A_{network}$, for the same PM parameter x, if non-zero $A_{client}$ parameter x equals $A_{network}$ parameter x, identifying that a problem is manifest in equipment upstream of node A, and for the same PM parameter x, if $A_{network}$ parameter x is greater than $A_{client}$ parameter x, identifying that a problem is manifest in path equipment between nodes A and Z.

Another aspect of the method includes correlating the path nodes A and Z to physical ports at nodes Z and A for monitoring path points of interest $Z_{client}$ and $Z_{network}$, obtaining PM parameter data for path points of interest $Z_{client}$ and $Z_{network}$, for the same PM parameter x, if non-zero $Z_{client}$ parameter x equals $Z_{network}$ parameter x, identifying that a problem is manifest in equipment upstream of node Z, and for the same PM parameter x, if $Z_{network}$ parameter x is greater than $Z_{client}$ parameter x, identifying that a problem is manifest in path equipment between nodes Z and A.

Another aspect of the method includes setting threshold values for each PM parameter x at path points of interest $A_{client}$ and $A_{network}$, if $A_{client}$ parameter x and/or $A_{network}$ parameter x is outside of its threshold value, observing $A_{client}$ parameter x and/or $A_{network}$ parameter x over an accumulation period wherein $A_{client}$ parameter x and/or $A_{network}$ parameter x values outside of their threshold values are counted, if after the accumulation period, the count for $A_{client}$ parameter x and/or $A_{network}$ parameter x is determined to be increasing, alerting a degrading condition for equipment upstream of path points of interest $A_{client}$ and/or network respectively.

Another aspect of the method includes setting threshold values for each PM parameter x at path points of interest $Z_{client}$ and $Z_{network}$ if $Z_{client}$ parameter x and/or $Z_{network}$ parameter x is outside of its threshold value, observing $Z_{client}$ parameter x and/or $Z_{network}$ parameter x over an accumulation period wherein $Z_{client}$ parameter x and/or $Z_{network}$ parameter x values outside of their threshold values are counted, if after the accumulation period, the count for $Z_{client}$ parameter x and/or $Z_{network}$ parameter x is determined to be increasing, alerting a degrading condition for equipment upstream of path points of interest $Z_{client}$ and/or $Z_{network}$ respectively.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 5A, 5B and 5C is an exemplary list of Performance Monitoring (PM) parameters and definitions.

FIG. 7 is an exemplary end-to-end path management status report.

DETAILED DESCRIPTION

Figure 1:
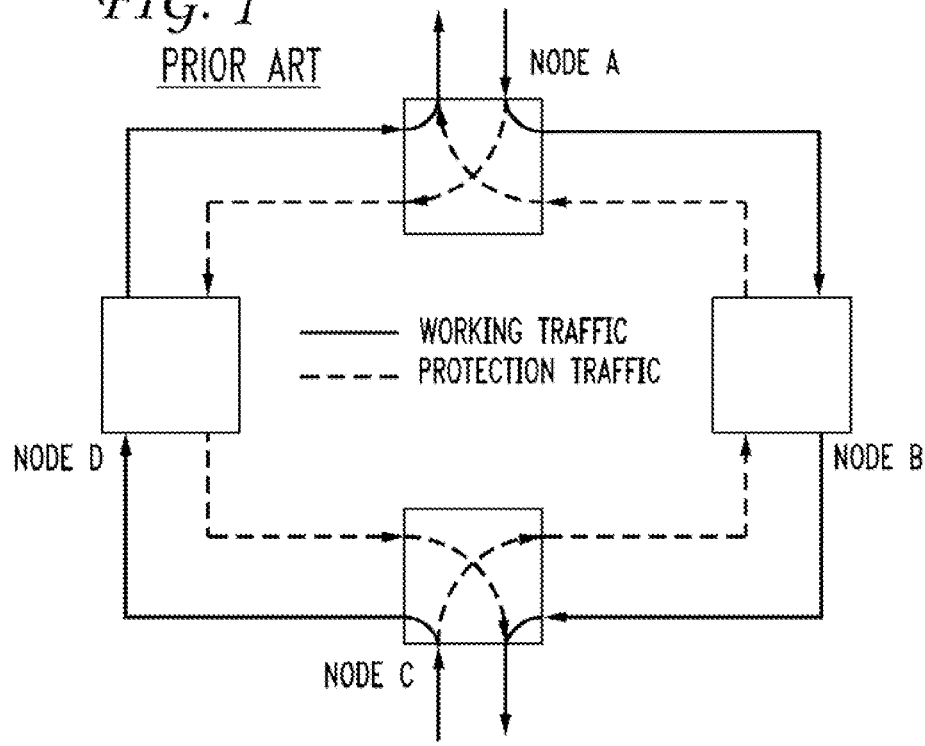
FIG. 1 is an exemplary dual-ring network.
Figure 2:
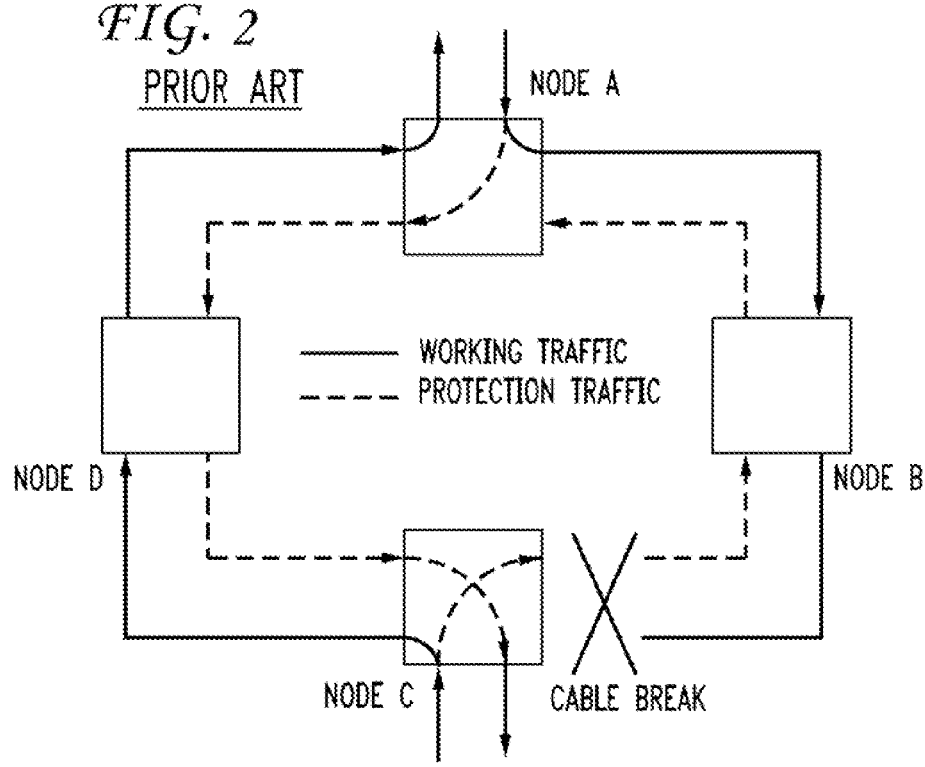
FIG. 2 is the exemplary dual-ring network in FIG. 1 sustaining a dual fiber break.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting and coupling. Further, "connected" and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the system and method may be implemented in software or hardware such as FPGAs, ASICs and processors.

Embodiments of the invention provide methods, systems, and a computer-usable medium storing computer-readable instructions for monitoring, analyzing and reporting on performance, availability and quality of optical network paths. The invention is a modular framework and is deployed as software as an application program tangibly embodied on a program storage device. The application code for execution can reside on a plurality of different types of computer readable media known to those skilled in the art.

Embodiments correlate SONET/Ethernet PM parameter data to indicate the health status of end-to-end SONET/Ethernet network paths. Ethernet is carried over a SONET/SDH network via Generic Framing Procedure (GFP). GFP is a protocol that maps the client Ethernet packet data onto the SONET network. SONET PM parameter data and Ethernet specific PM parameter data is monitored. Client signals enter the network with or without errors and are transported across a network path during which time signal errors may be propagated or may be introduced. Embodiments predict problems in network paths that may impact customer applications and provide proactive alerting mechanisms such as automatic maintenance ticket generation. Customers' network path status is visible via Web-based views and reports.

Embodiments sample a customer's SONET/SDH path at four distinct points, and coupled with threshold-based alarms for one or more PM parameters, provide effective management, monitoring, analyzing and reporting of performance, availability and the quality of each customer's path. The correlated SONET PM data, paths, and customer data is made available to a reporting system. The reporting system generates a historical data trend for customer access and viewing via a Graphical User Interface (GUI).

Figure 3:
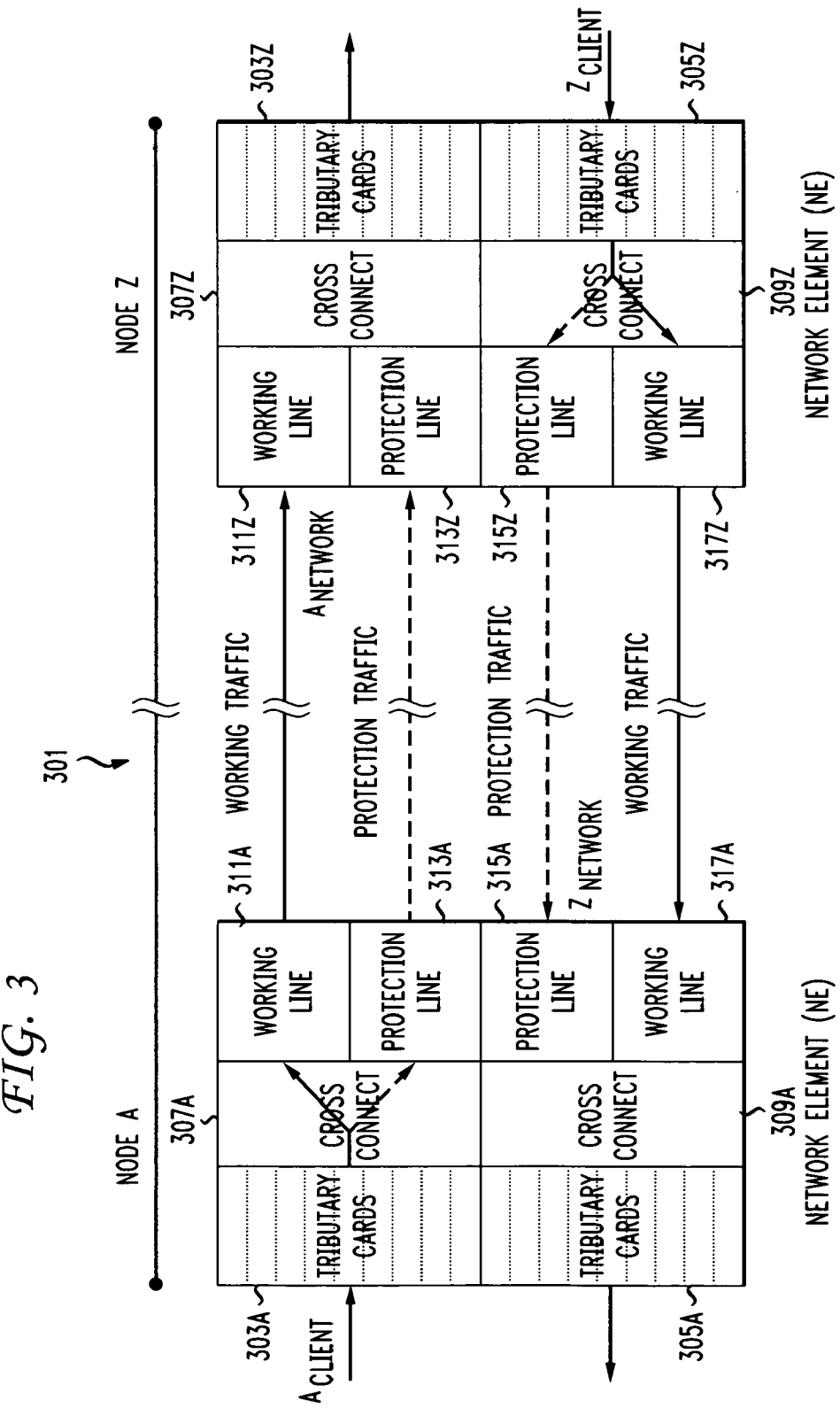
FIG. 3 is an exemplary end-to-end path showing monitoring points of interest.

FIG. 3 shows a simplified SONET bidirectional end-to-end path connection 301, from a source node A (path terminating node) NE to a destination node Z (path terminating node) NE. One or more nodes (B through Y) may reside between the path terminating nodes A and Z and may form SONET sections and lines. The SONET network architecture between node A and node Z may be a dual-ring configured as a UPSR, a BLSR using working traffic and protection traffic fibers, or other configurations. SONET rings provide a fault tolerant and flexible transmission architecture.

The A and Z path terminating nodes are NEs comprised of tributary card groups 303A, 303Z, 305Z, 305A which can map DSX and OC-N digital signal levels into synchronous Virtual Tributaries (VT) VT1.5s and DS3s into Synchronous Transport Signals (STS-X) of the first level, STS-1. VT1.5s are mapped into STS-1s for transport across the network path. The synchronous nature of the VT1.5 and STS-1 allows for direct access to the payload and facilitates efficient add/drop multiplexing and grooming. The tributary card groups 303A, 303Z, 305Z, 305A convert an electrical signal such as DS3 to an OC-N signal such as OC-12. Channelized Synchronous Payload Envelope (SPE) traffic from the tributary card groups 303A, 303Z, 305Z, 305A is transmitted to and received from SONET Digital Cross-Connects (DCC) 307A, 307Z, 309Z, 309A. The DCCs 307A, 307Z, 309Z, 309A terminate SONET and DSX signals and accept optical OC-N signals and STS-1s, DS1s and DS3s. In a DCC, the switching may be performed at any granularity, for example, STS-1, STS-3, and others, cross-connecting the constituent VTs between STS-X terminations.

An exemplary OC-3 system can transport 84 DS1s, 3 DS3s or any combination in-between. DS1s are interfaced to the SONET carrier using tributary card groups (low speed modules). Each tributary card in a group accepts DS1s and maps each DS1 into a VT1.5. The VT1.5s are combined to form a Virtual Tributary Group (VTG). The VTGs are multiplexed into an STS-1 and passed to Optical Line Interface Units (OLIU) 311A, 311Z, 313A, 313Z, 315Z, 315A, 317Z, 317A for multiplexing to the OC-3 line rate.

Four PM parameter data measuring points of interest are defined in each end-to-end customer path (circuit), from node A to node Z and from node Z to node A. For the node A to node Z path direction, an A-side client facing reference $A_{client}$ is obtained from PM parameters derived at the node A tributary card group 303A and an A-side network facing reference $A_{network}$ is obtained from PM parameters derived at the node Z OLIU cards 311Z, 313Z.

The connection between $A_{client}$ and $A_{network}$ (and similarly for the Z information) is made starting with the tributary card, and traversing the cross-connect to locate where on the line side the signal leaves the node. The same logic is performed at node Z. The value which is referred to as $A_{network}$ is actually the PM parameter data that is retrieved at the point on node Z's line side card. The PM parameter data for the points of interest are the near-end receive ($A_{client}$) and far-end receive ($A_{network}$).

For the node Z to node A path direction, a Z-side client facing reference $Z_{client}$ is obtained from PM parameters derived at the node Z tributary card group 305Z and a Z-side network facing reference $Z_{network}$ is obtained from PM parameters derived at the node A OLIU cards 315A, 317A. Each PM parameter measuring point of interest $A_{client}$, $A_{network}$, $Z_{client}$ and $Z_{network}$ collects SONET PM parameter data derived at that location belonging to an associated customer's path.

Figure 4:
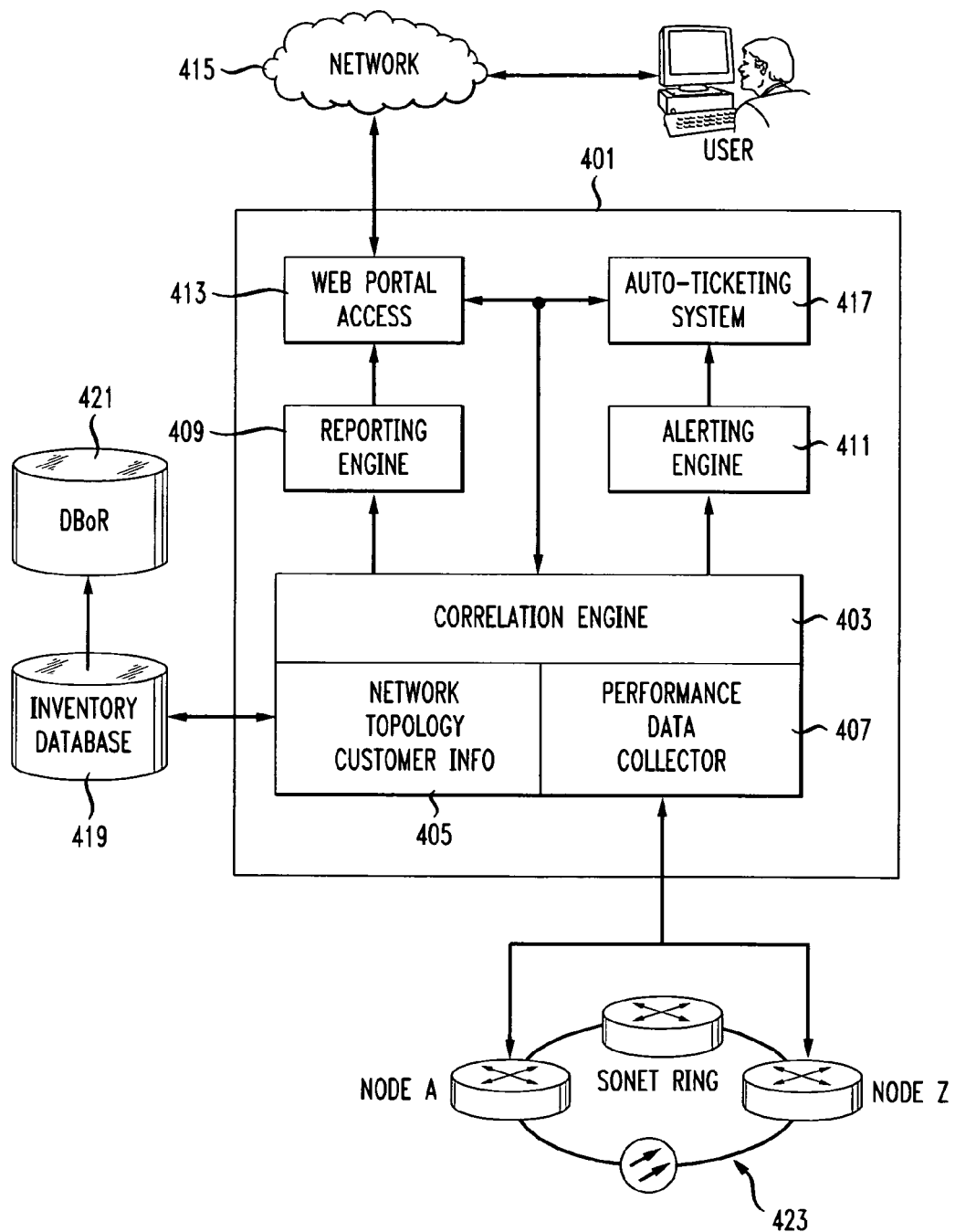
FIG. 4 is an exemplary end-to-end path management system framework.

FIG. 4 shows an embodiment of a system framework 401. The framework 401 includes a correlation engine 403 that includes a network topology customer information collector 405 and a PM parameter data collector 407. The correlation engine 403 is coupled to a reporting engine 409 and an alerting engine 411. The reporting engine 409 is coupled to a Web access portal 413 for coupling with a network 415 such as the Internet. The alerting engine 411 is coupled to an automatic ticketing system 417 for issuing maintenance tickets depending on the status of a customer's provisioned path(s). The network topology customer information collector 405 is coupled to an inventory database 419 and a Database of Record (DBOR) 421 for the network 415. The network topology customer information collector 405 is configured to obtain a list of customers and their provisioned paths from the network 415.

For each customer provisioned end-to-end path, the inventory database 419 stores the path data as a circuit traverses from its source node to its destination node. For example, a path connection may be provisioned from New York, N.Y. to Los Angeles, Calif., establishing New York as the source node (A) and Los Angeles as the destination node (Z) 423. During path provisioning, any number of intervening NEs may be employed between the path terminating nodes. The inventory database 419 maintains all path information and the identity and location of each NE in the path. The description describes paths contained within a single SONET ring. However, paths traversing inter-connected rings may also be considered. In such cases, not every NE in a path will be known. Continuity from source to destination nodes is afforded by an abstraction of the NEs that physically connect SONET rings.

The tributary card groups and OLIU cards for nodes A and Z are polled in predetermined time periods via a set of Transaction Language 1 (TL1) messages issued by the PM parameter data collector 407 to acquire PM parameter data for each customer's path connection 423 to be compared. TL1 is a traditional telecom language for managing and reconfiguring SONET NEs. The TL1 commands may depend upon the card vendor, the vendor's technology and the technology release number. There are a number of specific TL1 retrieve PM commands that are functionally equivalent covering DSX, OC-N, STS-N, TX and VTX. TL1 or other command languages used by SONET NEs may be carried by other management protocols such as SNMP, CORBA and XML.

SONET network management for SONET NEs has a number of management interfaces. These are an electrical interface and a craft interface. The electrical interface sends SONET TL1 commands from a local management network physically housed in an office where a SONET NE is located to any location for monitoring. The SONET TL1 commands are used for local management of that NE and remote management of other SONET NEs. The craft interface are for local technicians who can access a SONET NE on a port and issue commands through a dumb terminal or terminal emulation program running on a user's laptop.

SONET NEs have a large set of standards for PM data. The PM criteria allow for monitoring not only the health status of individual NEs, but for the isolation and identification of most network defects or outages. Higher-layer network monitoring and management software allows for the proper filtering and troubleshooting of network-wide PM so that defects and outages can be quickly identified and responded to.

The PM parameter data acquired by the PM parameter data collector 407 for each PM parameter measuring point of interest $A_{client}$, $A_{network}$, $Z_{client}$ and $Z_{network}$ may include the parameters shown in FIGS. 5A, 5B and 5C. As an example, there may be four Path Coding Violations (CV-P) acquired, one for each point of interest $A_{client}$CV-P, $A_{network}$CV-P, $Z_{client}$CV-P and $Z_{network}$CV-P for one path. Any number of PM parameters may be acquired for the points of interest to perform the method.

The PM parameter data collector 407 acquires the path-level PM parameter data from each terminating node NE for PM parameter data measuring points of interest $A_{client}$, $A_{network}$, $Z_{client}$ and $Z_{network}$ through the issuance of TL1 commands for each customer provisioned path. SONET paths are typically provisioned with Internet Protocol Performance Metrics (IPPM) to enable end-to-end path-level performance monitoring. Each path produces an accumulation of PM parameter data for each point of interest $A_{client}$, $A_{network}$, $Z_{client}$ and $Z_{network}$. If 30 PM parameters are employed, the framework 401 will acquire 30 PM parameters for each point of interest $A_{client}$, $A_{network}$, $Z_{client}$ and $Z_{network}$, for each customer provisioned path connection, in predetermined time periods, for example, a count every 15 minutes.

The inventory database 419 containing each customer and each customer's paths is mapped with each point of interest $A_{client}$, $A_{network}$, $Z_{client}$ and $Z_{network}$ for each path over time. While point of interest data acquisition is taking place, the correlation engine 403 performs a comparison of the PM parameter data to determine the status of each customer's paths.

Figure 6:
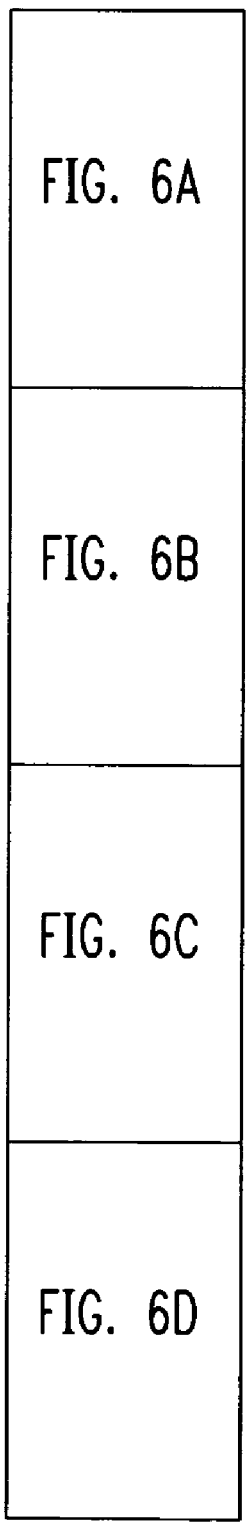
FIG. 6 is an exemplary end-to-end path management method.
Figure 6A:
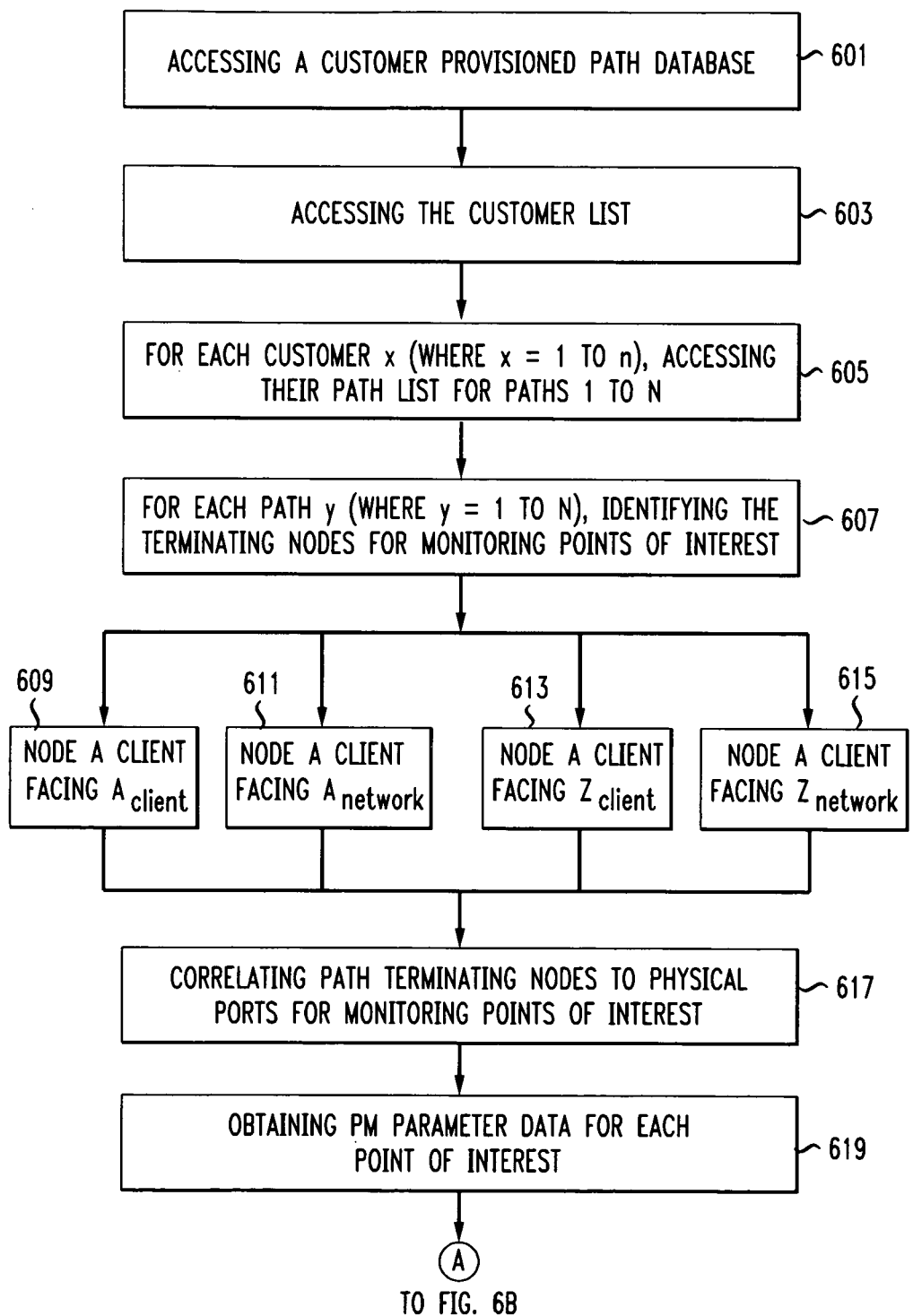
Figure 6B:
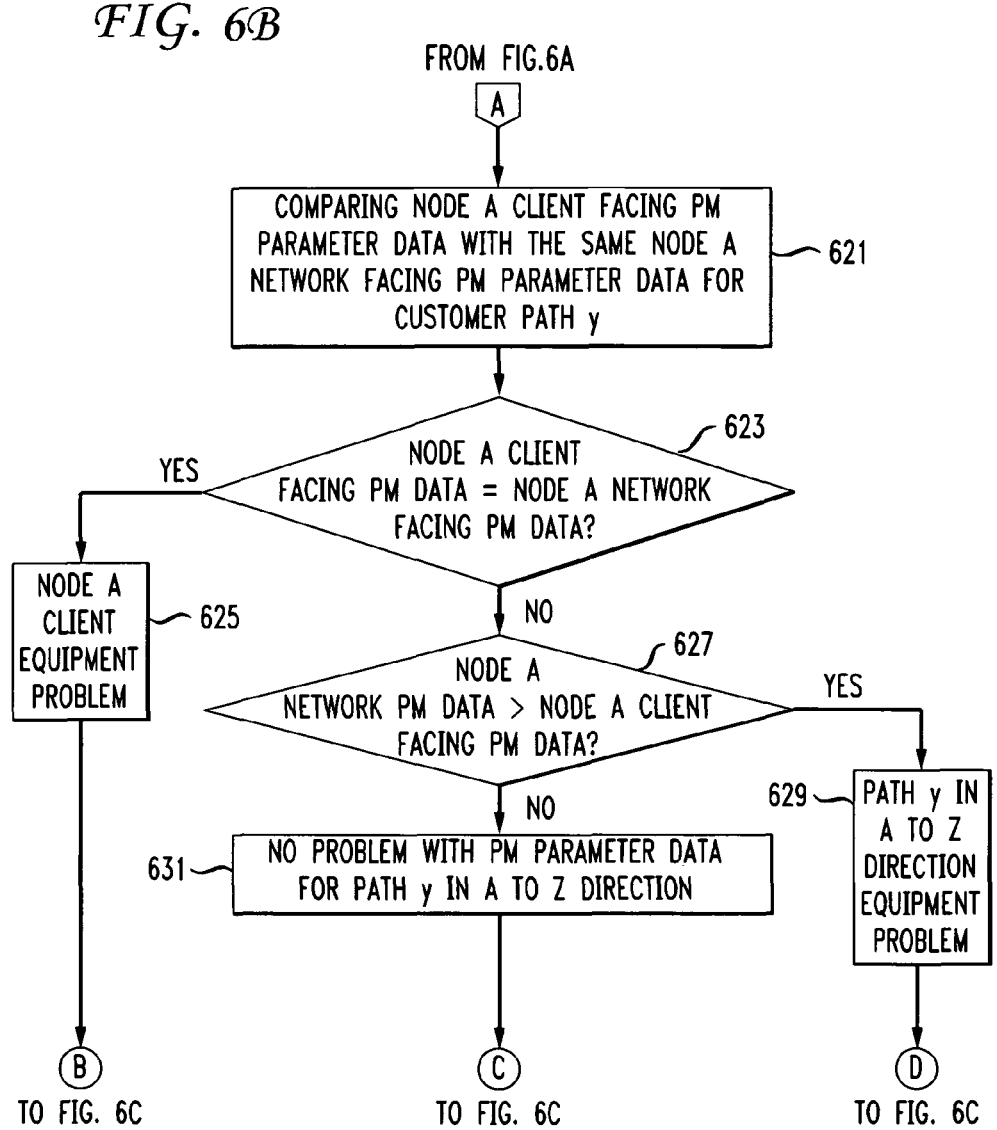
Figure 6C:
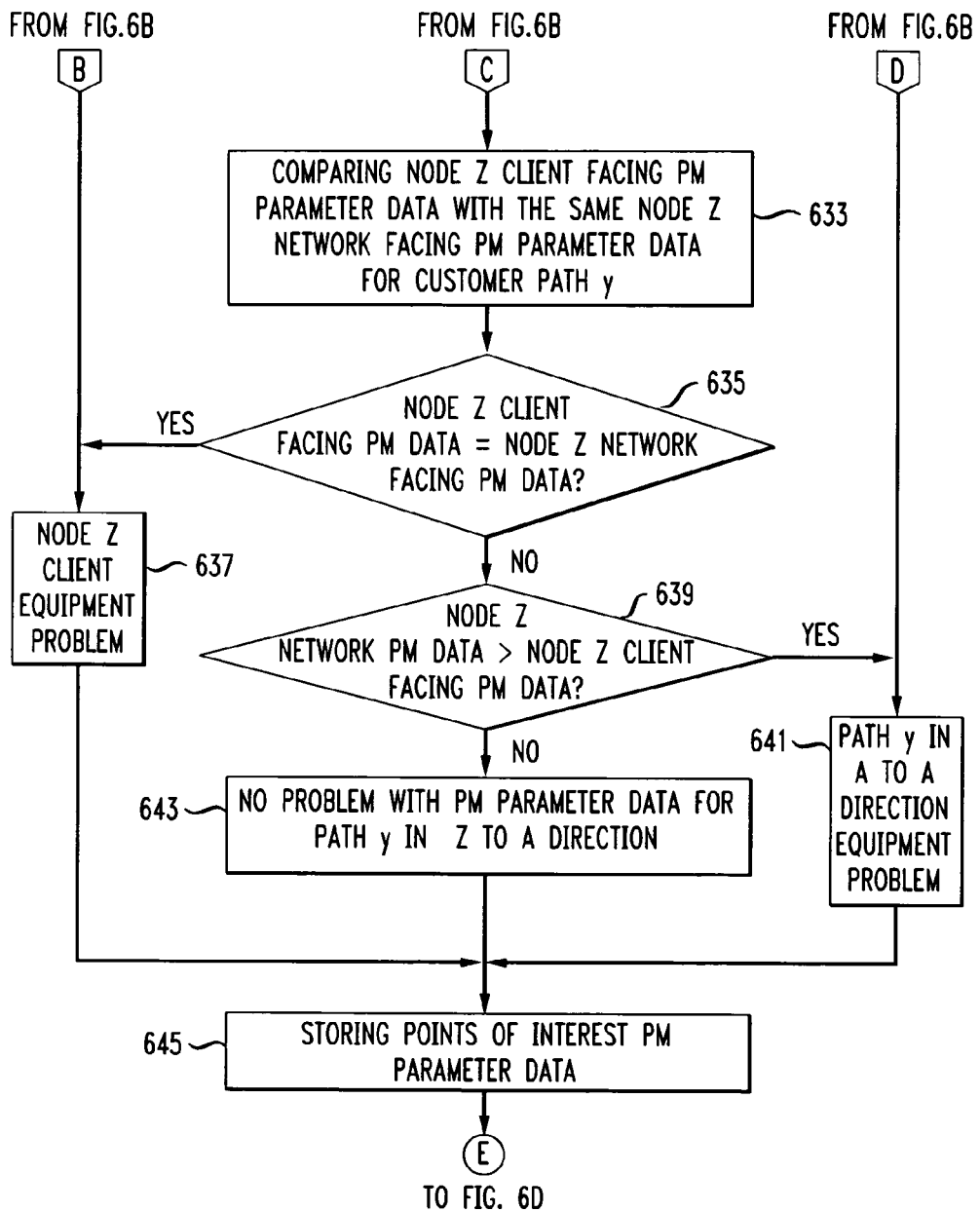
Figure 6D:
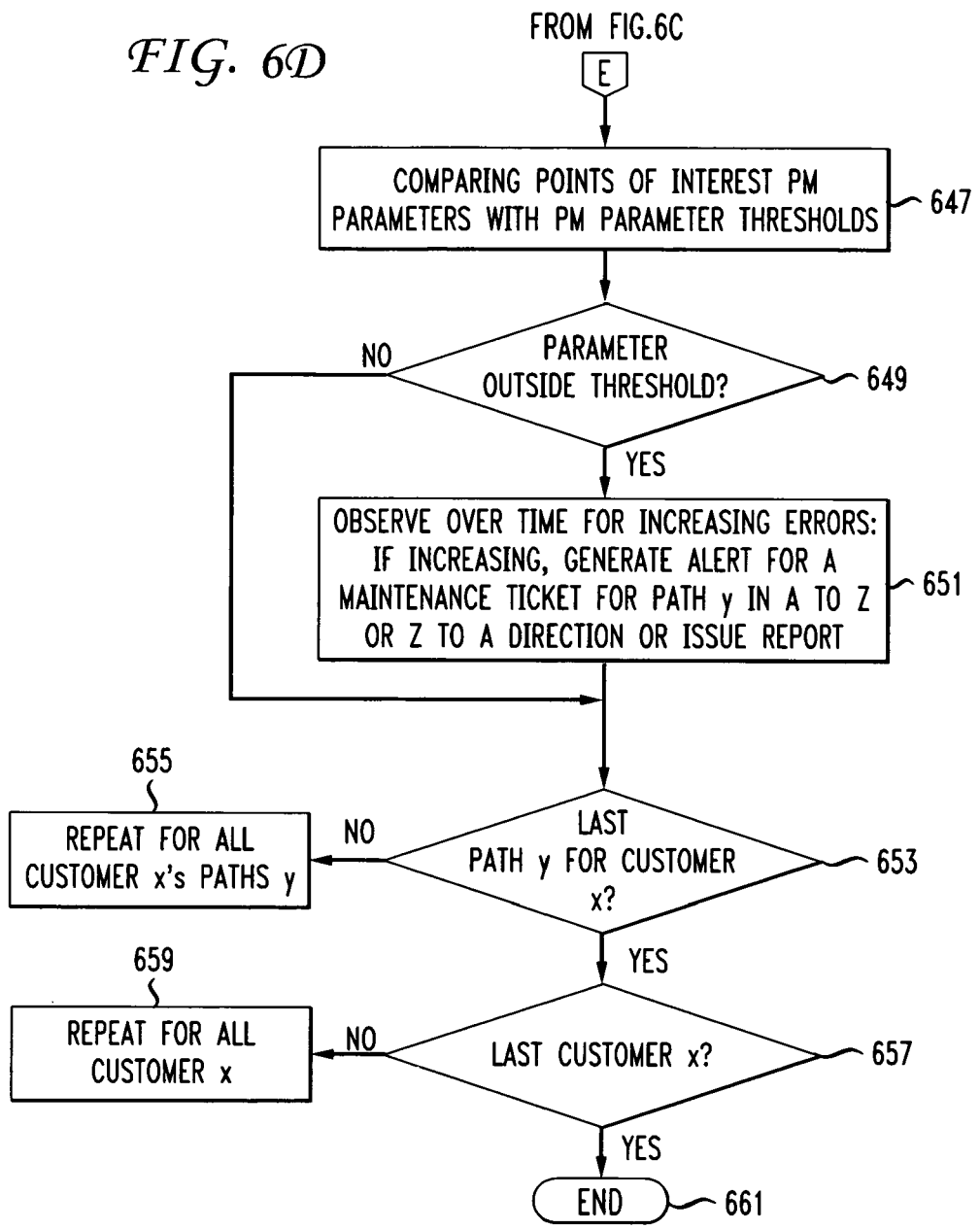

FIG. 6 shows the method. The customer provisioned path database is accessed (steps 601, 603). Each customer's paths are examined to identify each path's respective terminating nodes A and Z (step 605, 607).

Each point of interest $A_{client}$, $A_{network}$, $Z_{client}$ and $Z_{network}$ for a customer's path connection is identified (steps 607, 609, 611, 613, 615) and is correlated with the identity of the physical NE cards at node A and node Z (step 617). TL1 commands are issued by the PM data collector 407 to obtain the PM parameter data for each point of interest $A_{client}$, $A_{network}$, $Z_{client}$ and $Z_{network}$ (step 619).

A comparison of same PM parameter data is performed for each direction (step 621). For the path direction from node A to node Z, if a non-zero point of interest $A_{client}$ PM parameter value (for example, $A_{client}$CV-P) is equal to the same PM parameter at point of interest $A_{network}$ (for example, $A_{network}$CV-P), $$A_{client} \text{ parameter x} = A_{network} \text{ parameter x}, \quad (1)$$

the comparison indicates that errors (the non-zero $A_{client}$ PM parameter value) reported in the PM parameter data were introduced by client equipment upstream of node A (steps 623, 625). The condition $A_{client}$ parameter x>$A_{network}$ parameter x cannot occur because PM parameter counts obtained from the downstream nodes (in this case terminating node Z) are cumulative. The condition $A_{client}$ parameter x<$A_{network}$ parameter x is logically equivalent to $A_{network}$ parameter x>$A_{client}$ parameter x described below.

For the same PM parameter data, if a non-zero point of interest $A_{network}$ PM parameter value (for example, $A_{network}$CV-P) is greater than the same PM parameter at point of interest $A_{client}$ (for example, $A_{client}$CV-P), $$A_{network} \text{ parameter x} > A_{client} \text{ parameter x}, \quad (2)$$

the comparison indicates that the additional errors reported in the $A_{network}$ PM parameter data were introduced by network equipment during transmission from node A to node Z (steps 627, 629).

For the case $A_{network}$ parameter x>$A_{client}$ parameter x, it is possible that $A_{client}$ is zero, but $A_{network}$ is non-zero thus indicating a problem introduced by network equipment. However, where $A_{client}$ parameter x=$A_{network}$ parameter x, the parameter should be non-zero. Also, the PM parameter points of interest are the "near-side, receive" parameters for a particular measuring point of interest $A_{client}$, $A_{network}$, $Z_{client}$ and $Z_{network}$.

If the comparisons in (1) and (2) are not true, no problem was experienced with that PM parameter (step 631).

For the path direction from node Z to node A, if a non-zero point of interest $Z_{client}$ PM parameter value (for example, $Z_{client}$CV-P) is equal to the same parameter at point of interest $Z_{network}$ (for example, $Z_{network}$CV-P), $$Z_{client} \text{ parameter x} = Z_{network} \text{ parameter x}, \quad (3)$$

the comparison indicates that errors (the non-zero $Z_{client}$ PM parameter value) reported in the PM parameter data were introduced by client equipment upstream of node Z (steps 633, 635, 637). The condition $Z_{client}$ parameter x>$Z_{network}$ parameter x cannot occur because PM parameter counts obtained from the downstream nodes (in this case terminating node A) are cumulative. The condition $Z_{client}$ parameter x<$Z_{network}$ parameter x is logically equivalent to $Z_{network}$ parameter x>$Z_{client}$ parameter x described below.

For the same PM parameter data, if a non-zero point of interest $Z_{network}$ PM parameter value (for example, $Z_{network}$CV-P) is greater than the same PM parameter at point of interest $Z_{client}$ (for example, $Z_{client}$CV-P), $$Z_{network} \text{ parameter x} > Z_{client} \text{ parameter x}, \quad (4)$$

the comparison indicates that the additional errors reported in the $A_{network}$ PM parameter data were introduced by network equipment during transmission from node Z to node A (steps 639, 641).

If the comparisons in (3) and (4) are not true, no problem was experienced with that PM parameter (step 643).

The PM parameter data for $A_{client}$ parameter x, $A_{network}$ parameter x, $Z_{client}$ parameter x and $Z_{network}$ parameter x (for example, CV-P) are stored and trend for predicting future failures and for report preparation (step 645), allowing for predictive and proactive maintenance 417 of a customer's SONET assets.

PM parameter threshold values (operating regions) for $A_{client}$ parameter x, $A_{network}$ parameter x, $Z_{client}$ parameter x and $Z_{network}$ parameter x may be established on a per parameter basis to serve as baseline values. When a given PM parameter for $A_{client}$ parameter x, $A_{network}$ parameter x, $Z_{client}$ parameter x and/or $Z_{network}$ parameter x (for example, CV-P) is outside of its respective predefined threshold value (steps 647, 649), the condition may be observed over a predetermined accumulation period while the alerting engine 411 counts errors to see if the parameter data (error value) are increasing over the PM parameter sampling periods. If the PM parameter value continues to increase, an unresolved, deteriorating condition is persisting and a determination is made to generate an alarm by the alerting engine 411 for the affected customer path. A maintenance ticket is issued by the auto-ticketing system 417 (step 651). If the PM parameter value remains outside of its threshold value but does not increase over the predetermined accumulation period covering the PM parameter sampling periods, a report may be generated by the reporting engine 409 for the affected customer path.

Embodiments acquire PM parameter data at the points of interest and correlate the measurements and measurement differences with a respective path as a holistic view as opposed to acquiring PM parameter data associated with a given port. Path severities can be attributed to the resultant values as appropriate.

The predetermined thresholds are set in the alerting engine 411. The thresholds are used to set error levels for each monitored point of interest PM parameter $A_{client}$ parameter x, $A_{network}$ parameter x, $Z_{client}$ parameter x and $Z_{network}$ parameter x, and may provide early detection of performance degradation.

The method is repeated for each customer's path connections (steps 653, 655) and for each customer in the path connection provisioned database 419 (steps 657, 659, 661).

By sampling the PM parameter data for a customer's provisioned SONET path, the four points of interest in conjunction with threshold-based alarm generation allows for effective management, monitoring, analyzing and reporting of performance, availability and quality of optical networks. The correlated PM parameter data, path, and customer data is presented to the reporting engine 409 providing historical data and trending to be available via a GUI.

FIG. 7 shows an exemplary result of the system and method indicating the threshold crossings status for one customer's path connections (circuits) for a given PM parameter (x) measured for points of interest $A_{client}$, $A_{network}$, $Z_{client}$ and $Z_{network}$ for each sampling period. The A-side information includes a "Client Trouble Threshold" which is a user specified value for $A_{client}$ parameter x client threshold, a "Client Value" which is an error count for PM parameter (x) introduced by the client equipment upstream of point of interest $A_{client}$, a "Network Trouble Threshold" which is a user specified value for $A_{network}$ parameter x network threshold, and a "Network Trouble Value" which is an error count for PM parameter (x) introduced by the network equipment between $A_{network}$ and $A_{client}$. Similarly, the Z-side information includes a "Client Trouble Threshold" which is a user specified value for $Z_{client}$ parameter x client threshold, a "Client Value" which is an error count for PM parameter (x) introduced by the client equipment upstream of point of interest $Z_{client}$, a "Network Trouble Threshold" which is a user specified value for $Z_{network}$ parameter x network threshold, and a "Network Trouble Value" which is an error count for PM parameter (x) introduced by the network equipment between $Z_{network}$ and $Z_{client}$.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for assessing the status of a plurality of network provisioned end to end paths of a network user, comprising:
   accessing a network provisioned path database;
   selecting a provisioned end to end path of the network user from the database, the path being a ring having a forward path including points of interest $A_{client}$ and $A_{network}$, and having a return path including points of interest $Z_{client}$ and $Z_{network}$, wherein:
      path point of interest $A_{client}$ is an A-side near-end receive client facing reference obtained from performance monitoring parameters derived at the node A tributary card group;
      path point of interest $A_{network}$ is an A-side far-end receive network facing reference obtained from performance monitoring parameters derived at the node Z optical line interface unit card group;
      path point of interest $Z_{client}$ is a Z-side near-end receive client facing reference obtained from performance monitoring parameters derived at the node Z tributary card group; and
      path point of interest $Z_{network}$ is a Z-side far-end receive network facing reference obtained from performance monitoring parameters derived at the node A optical line interface unit card group;
   for the path, identifying from the database the path source terminating node A and path destination terminating node Z;
   correlating the path nodes A and Z to physical ports at nodes A and Z for monitoring the path points of interest $A_{client}$ and $A_{network}$;
   obtaining performance monitoring parameter data for the path points of interest $A_{client}$ and $A_{network}$;
   for a same performance monitoring parameter x, if non-zero $A_{client}$ parameter x equals $A_{network}$ parameter x, identifying that a problem is manifest in equipment of the network user upstream of node A;
   for the same performance monitoring parameter x, if $A_{network}$ parameter x is greater than $A_{client}$ parameter x, identifying that a problem is manifest in path equipment within the provisioned end to end path between nodes A and Z;
   correlating the path nodes A and Z to physical ports at nodes Z and A for monitoring the path points of interest $Z_{client}$ and $Z_{network}$;
   obtaining performance monitoring parameter data for the path points of interest $Z_{client}$ and $Z_{network}$;
   for the same performance monitoring parameter x, if non-zero $Z_{client}$ parameter x equals $Z_{network}$ parameter x, identifying that a problem is manifest in equipment of the network user upstream of node Z; and
   for the same performance monitoring parameter x, if $Z_{network}$ parameter x is greater than $Z_{client}$ parameter x, identifying that a problem is manifest in path equipment within the provisioned end to end path between nodes Z and A;
   repeating for a plurality of remaining network provisioned end to end paths of the network user; and
   preparing a report recommending maintenance of the network user's network provisioned end to end paths based on the performance monitoring parameter data.

2. The method according to claim 1 wherein the performance monitoring parameter data is obtained from a performance monitoring parameter database.

3. The method according to claim 1 wherein the performance monitoring parameter data is obtained from network elements at the path points of interest $A_{client}$ and $A_{network}$.

4. The method according to claim 1 wherein the performance monitoring parameter data is obtained from a performance monitoring parameter database.

5. The method according to claim 1 wherein the performance monitoring parameter data is obtained from network elements at the path points of interest $Z_{client}$ and $Z_{network}$.

6. The method according to claim 1 further comprising:
   setting threshold values for each performance monitoring parameter x at path points of interest $A_{client}$ and $A_{network}$;
   if $A_{client}$ parameter x and/or $A_{network}$ parameter x is outside of its threshold value, observing $A_{client}$ parameter x and/or $A_{network}$ parameter x over an accumulation period wherein $A_{client}$ parameter x and/or $A_{network}$ parameter x values outside of their threshold values are counted;
   if after the accumulation period, the count for $A_{client}$ parameter x and/or $A_{network}$ parameter x is determined to be increasing, alerting a degrading condition for equipment upstream of path points of interest $A_{client}$ and/or $A_{network}$ respectively.

7. The method according to claim 6 further comprising if after the accumulation period, the count for $A_{client}$ parameter x and/or $A_{network}$ parameter x is determined to be not increasing, issuing a report for the path for parameter x that includes errors introduced by equipment upstream of path point of interest $A_{client}$ and errors introduced by network equipment defined between path points of interest $A_{network}$ and $A_{client}$.

8. A non-transitory computer-usable medium having computer readable instructions stored thereon for execution by a processor to perform a method for assessing the status of a plurality of network provisioned end to end paths of a network user, the method comprising:
   accessing a network provisioned path database;
   selecting a provisioned end to end path of the network user from the database, the path being a ring having a forward path including points of interest $A_{client}$ and $A_{network}$, and having a return path including points of interest $Z_{client}$ and $Z_{network}$, wherein:
      path point of interest $A_{client}$ is an A-side near-end receive client facing reference obtained from performance monitoring parameters derived at the node A tributary card group;
      path point of interest $A_{network}$ is an A-side far-end receive network facing reference obtained from performance monitoring parameters derived at the node Z optical line interface unit card group;

path point of interest $Z_{network}$ is a Z-side near-end receive client facing reference obtained from performance monitoring parameters derived at the node Z tributary card group; and path point of interest $Z_{network}$ is a Z-side far-end receive network facing reference obtained from performance monitoring parameters derived at the node A optical line interface unit card group;

for the path, identifying from the database the path source terminating node A and path destination terminating node Z;

correlating the path nodes A and Z to physical ports at nodes A and Z for monitoring the path points of interest $A_{client}$ and $A_{network}$;

obtaining performance monitoring parameter data for the path points of interest $A_{client}$ and $A_{network}$;

for a same performance monitoring parameter x, if non-zero $A_{client}$ parameter x equals $A_{network}$ parameter x, identifying that a problem is manifest in equipment of the network user upstream of node A;

for the same performance monitoring parameter x, if $A_{network}$ parameter x is greater than $A_{client}$ parameter x, identifying that a problem is manifest in path equipment within the provisioned end to end path between nodes A and Z;

correlating the path nodes A and Z to physical ports at nodes Z and A for monitoring the path points of interest $Z_{client}$ and $Z_{network}$;

obtaining performance monitoring parameter data for the path points of interest $Z_{client}$ and $Z_{network}$;

for the same performance monitoring parameter x, if non-zero $Z_{client}$ parameter x equals $Z_{network}$ parameter x, identifying that a problem is manifest in equipment of the network user upstream of node Z; and for the same performance monitoring parameter x, if $Z_{network}$ parameter x is greater than $Z_{client}$ parameter x, identifying that a problem is manifest in path equipment within the provisioned end to end path between nodes Z and A;

repeating for a plurality of remaining network provisioned end to end paths of the network user; and preparing a report recommending maintenance of the network user's network provisioned end to end paths based on the performance monitoring parameter data.

9. The non-transitory computer-usable medium according to claim 8 wherein the performance monitoring parameter data is obtained from a performance monitoring parameter database.

10. The non-transitory computer-usable medium according to claim 8 wherein the performance monitoring parameter data is obtained from network elements at the path points of interest $A_{client}$ and $A_{network}$.

11. The non-transitory computer-usable medium according to claim 8 wherein the performance monitoring parameter data is obtained from a performance monitoring parameter database.

12. The non-transitory computer-usable medium according to claim 8 wherein the performance monitoring parameter data is obtained from network elements at the path points of interest $Z_{client}$ and $Z_{network}$.

13. The non-transitory computer-usable medium according to claim 8, wherein the method further comprises:

setting threshold values for each performance monitoring parameter x at path points of interest $A_{client}$ and $A_{network}$;

if $A_{client}$ parameter x and/or $A_{network}$ parameter x is outside of its threshold value, observing $A_{client}$ parameter x and/or $A_{network}$ parameter x over an accumulation period wherein $A_{client}$ parameter x and/or $A_{network}$ parameter x values outside of their threshold values are counted;

if after the accumulation period, the count for $A_{client}$ parameter x and/or $A_{network}$ parameter x is determined to be increasing, alerting a degrading condition for equipment upstream of path points of interest $A_{client}$ and/or $A_{network}$ respectively.

14. The non-transitory computer-usable medium according to claim 13 wherein the method further comprises:

if after the accumulation period, the count for $A_{client}$ parameter x and/or $A_{network}$ parameter x is determined to be not increasing, issuing a report for the path for parameter x that includes errors introduced by equipment upstream of path point of interest $A_{client}$ and errors introduced by network equipment defined between path points of interest $A_{network}$ and $A_{client}$.

* * * * *